(12) United States Patent
Ren (10) Patent No.: US 10,340,695 B2
(45) Date of Patent: Jul. 2, 2019

(54) BATTERY ENERGY STORAGE DESIGN WITH BLACK STARTING CAPABILITY

(71) Applicant: General Electric Company, Schenectady, NY (US)

(72) Inventor: Wei Ren, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 15/442,793

(22) Filed: Feb. 27, 2017

(65) Prior Publication Data
US 2018/0248378 A1 Aug. 30, 2018

(51) Int. Cl.
| H02H 9/00 | (2006.01) |
| H02J 3/32 | (2006.01) |
| H02J 3/38 | (2006.01) |
| H02J 3/40 | (2006.01) |
| H02J 7/00 | (2006.01) |
| H02J 9/06 | (2006.01) |
| H02J 11/00 | (2006.01) |
| H02M 7/537 | (2006.01) |

(52) U.S. Cl.
CPC ............ H02J 3/381 (2013.01); H02H 9/001 (2013.01); H02J 3/32 (2013.01); H02J 7/0063 (2013.01); H02J 9/062 (2013.01); H02J 11/00 (2013.01); H02M 7/537 (2013.01); H02J 3/40 (2013.01); H02J 2003/388 (2013.01); H02J 2007/0067 (2013.01); Y02E 40/10 (2013.01)

(58) Field of Classification Search
None
See application file for complete search history.

(56) References Cited

U.S. PATENT DOCUMENTS

| 5,798,633 A | 8/1998 | Larsen et al. |
| 7,113,380 B2 | 9/2006 | Youm |
| 7,834,479 B2 | 11/2010 | Capp et al. |
| 7,843,706 B2 | 11/2010 | Suzuki et al. |
| 2008/0084070 A1* | 4/2008 | Teichmann ............... H02J 3/38 290/55 |

(Continued)

OTHER PUBLICATIONS

Cai, N., "A hierarchical multi-agent control scheme for a black start-capable microgrid," IEEE Power and Energy Society General Meeting, pp. 1-7 (Jul. 24-29, 2011) (Abstract).

(Continued)

*Primary Examiner* — Jared Fureman
*Assistant Examiner* — Joel Barnett
(74) *Attorney, Agent, or Firm* — Dority & Manning, P.A.

(57) ABSTRACT

Systems and methods for black-starting a power system using a battery energy storage system can be provided. In one example implementation, a method includes obtaining, by the one or more controllers, a signal requesting a black-start of the power system using the battery energy storage system. The method further includes increasing, by one or more controllers, a system bus voltage to a nominal voltage level using the battery energy storage system for a start period according to a start ramp. The method further includes maintaining, by one or more controllers, the system bus voltage at about the nominal voltage level using the battery energy storage system during a normal period following the start period.

14 Claims, 5 Drawing Sheets

(56) References Cited

U.S. PATENT DOCUMENTS

| | | | | |
|---|---|---|---|---|
| 2014/0049865 A1* | 2/2014 | Dougal | .................... | H02H 3/06 |
| | | | | 361/71 |
| 2014/0360561 A1 | 12/2014 | Meyer et al. | | |
| 2015/0380942 A1* | 12/2015 | Premm | .................... | H02J 3/383 |
| | | | | 307/52 |
| 2016/0118801 A1* | 4/2016 | vor dem Esche | ....... | F01K 13/02 |
| | | | | 700/287 |
| 2016/0118859 A1* | 4/2016 | Schafer | .................... | H02J 9/066 |
| | | | | 307/84 |

OTHER PUBLICATIONS

International Search Report and Written Opinion issued in connection with corresponding PCT Application No. PCT/US2018/017958 dated Mar. 29, 2018.

* cited by examiner

BATTERY ENERGY STORAGE DESIGN WITH BLACK STARTING CAPABILITY

FIELD

The present subject matter relates generally to energy storage systems.

BACKGROUND

Energy storage systems have become increasingly used to deliver power to utility grids either as part of standalone energy storage systems or as part of a renewable energy source (e.g., wind generation or solar generation systems) with an integrated energy storage system. Energy storage systems are unique in that energy storage systems have the ability to both deliver and reserve energy for particular grid services. Energy storage systems, such as power conditioning systems, are used in a variety of applications, such as providing emergency back-up power or providing consistent power from variable energy sources, such as wind, solar, or other variable energy sources. In many applications, energy storage systems can include a plurality of energy storage devices, such as batteries, stored in an enclosure, such as a containerized, purpose-built enclosure, a stand-alone building, or an enclosed space within a stand-alone building.

Various planned or unplanned events can cause a power plant to lose power. An external AC grid to which the local AC grid is connected may have collapsed and no energy can be drawn. Power plants can black-start by using a battery energy storage system (BESS) to satisfy requests for power. However, there can be high in-rush current when plant transformer(s) are energized and power equipment can suffer following outages or short interruptions.

BRIEF DESCRIPTION

Aspects and advantages of embodiments of the present disclosure will be set forth in part in the following description, or can be learned from the description, or can be learned through practice of the embodiments.

One example aspect of the present disclosure is directed to a method for black-starting a power system using a battery energy storage system. The power system includes one or more loads coupled to a system bus. The method includes obtaining, by the one or more controllers, a signal requesting a black-start of the power system using the battery energy storage system. The method further includes increasing, by one or more controllers, a system bus voltage to a nominal voltage level using the battery energy storage system for a start period according to a start ramp. The method further includes maintaining, by one or more controllers, the system bus voltage at about the nominal voltage level using the battery energy storage system during a normal period following the start period.

Another example aspect of the present disclosure is directed to a control system for black-starting a power system using a battery energy storage system. The power system includes one or more loads coupled to a system bus. The control system includes one or more processors and one or more memory devices. The one or more memory devices store instructions that when executed by the one or more processors cause the one or more processors to perform operations. The operations include obtaining a signal requesting a black-start of the power system using the battery energy storage system. The operations further include increasing a system bus voltage to a nominal voltage level using the battery energy storage system for a start period according to a start ramp. The operations further include maintaining the system bus voltage at about the nominal voltage level using the battery energy storage system during a normal period following the start period.

Variations and modifications can be made to these example embodiments. These and other features, aspects and advantages of various embodiments will become better understood with reference to the following description and appended claims. The accompanying drawings, which are incorporated in and constitute a part of this specification, illustrate embodiments of the present disclosure and together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments of the present disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to systems and methods for black-starting a power plant using a BESS. The BESS can include a plurality of battery energy storage units with each battery energy storage unit comprising one or more battery energy storage devices and an inverter. When black-starting a power plant using a BESS, there can be high in-rush current when plant transformers are energized as well as large circulating current between BESS units. Induction motors, shunt capacitor banks, and cable charges can also introduce in-rush current. According to example embodiments, a BESS for black-starting a power plant with phased operating modes can be provided. Black starting a power plant can include starting a prime mover of a generator or auxiliary generator associated with the power plant. A system bus voltage can be increased gradually to reduce high in-rush current when energizing plant transformers. Gradually increasing the system bus voltage can help reduce large circulating currents between BESS units.

According to example embodiments of the present disclosure, each BESS unit can use the same logic and differentiation between master/slave units can be avoided. Each BESS unit can receive a slow command (e.g., tens of ms) from a controller and use local measurements to operate. As a result, fast communication between the units and a central controller can be reduced.

According to example embodiments of the present disclosure, one or more controllers can be used to initiate a black-start process when the power plant is disconnected from a power grid. The black-start process can include increasing a system bus voltage to a nominal voltage during a start period. As the system bus voltage is increased, individual BESS units can be connected to the system bus per each unit's own criteria of bus voltage and phase. When a threshold number of BESS units have connected to enable the system to operate a required load, example methods can include operating the BESS as an isolated grid before decreasing the system bus voltage and disconnecting the units.

In this way, example aspects of the present disclosure can provide a number of technical effects and benefits. As will be understood by those skilled in the art, high in-rush current of the plant transformers can be reduced by gradually increasing the system bus voltage during starting. Gradually decreasing the system bus voltage during stopping can remove residual charge from plant transformers. This can make a subsequent black-start more efficient. The system can be islanded and re-connected to the AC mains with comparatively simple controls, synchronizing automatically. Having the same set of controls can provide easy transition between grid-off and grid-on modes. According to example embodiments, the system can provide fault ride through capabilities during system low voltage and high voltage events. All BESS units can be used to bring up a power plant voltage to nominal value in short time without having to stagger the start of multiple units. Multiple BESS units can automatically synchronize together and share loads.

Referring now to the figures, example aspects of the present disclosure will be discussed in greater detail. As used herein, the term "about," when used in reference to a numerical value is intended to refer to within 30% of the numerical value.

Figure 1:
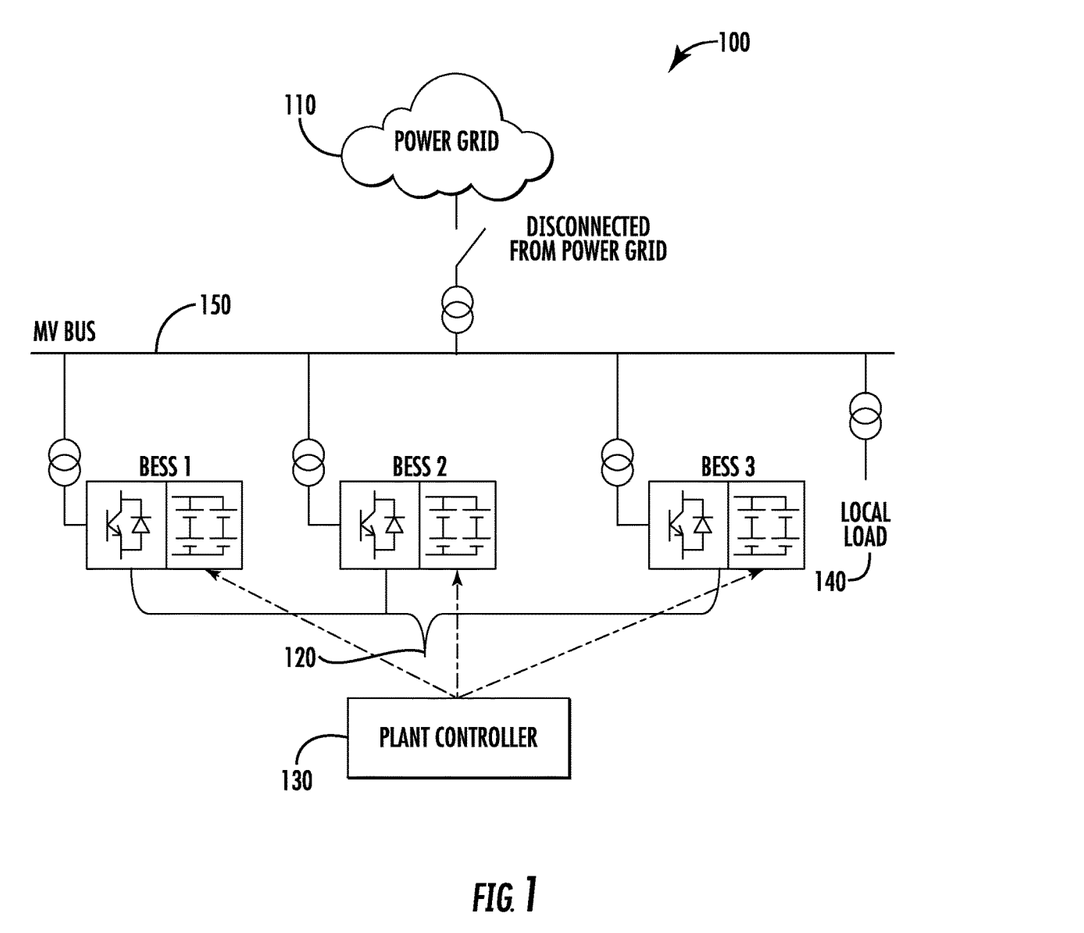
FIG. 1 depicts a circuit diagram of a plurality of BESS units according to example embodiments of the present disclosure.

FIG. 1 depicts an example circuit diagram of system 100 including a plurality of BESS units 120, of which three are illustrated in this embodiment. The number of BESS units 120 can be more or less without deviating from the scope of the present disclosure. Generally, the BESS units 120 are connectable to a local AC grid via switches and transformers. The plurality of BESS units 120 can be coupled to a system bus 150. A local load 140 can be coupled to the system bus 150. The load 140 can be served power from the BESS units 120 when there is no connection between the load 140 and a power grid 110. Controller 130 can be used to control one or more individual BESS units 120. The system bus voltage can be increased gradually to reduce high in-rush current when energizing transformers. Gradually increasing the system bus voltage can also help reduce in-rush current from stalled induction motors, shunt capacitor banks, and cable charges.

The BESS units 120 can include one or more battery energy storage devices, such as battery cells or battery packs. The battery energy storage device can contain one or more sodium nickel chloride batteries, sodium sulfur batteries, lithium ion batteries, nickel metal hydride batteries, or other similar devices. The present disclosure is discussed with reference to a battery energy storage system for purposes of illustration and discussion, those of ordinary skill in the art, using the disclosure provided herein, should understand that other energy storage devices (e.g., capacitors, fuel cells, etc.) can be used without deviating from the scope of the present disclosure.

BESS units 120 can include an inverter. The inverter can be configured to convert DC power on the DC bus to suitable AC power for application to a local load 140. The inverter can include one or more electronic switching elements, such as insulated gate bipolar transistors (IGBTs). The electronic switching elements can be controlled (e.g., using PWM) to convert the DC power on the DC bus to suitable AC power for the load 140. The inverter can provide AC power to the load 140 through a suitable transformer and various other devices, such as switches, relays, contactors, etc.

Controller 130 can be used to initiate a black-start process when a power plant is disconnected from a power grid 110. During the black-start process, BESS units 120 can provide power to the one or more loads 140 until a supplemental power source (e.g., a gas turbine engine) is started to provide power to one or more loads. In some embodiments, it may be desirable to power the one or more loads 140 with the BESS units 120 as long as possible without resorting to other energy sources, such as gas turbine engines.

Figure 4:
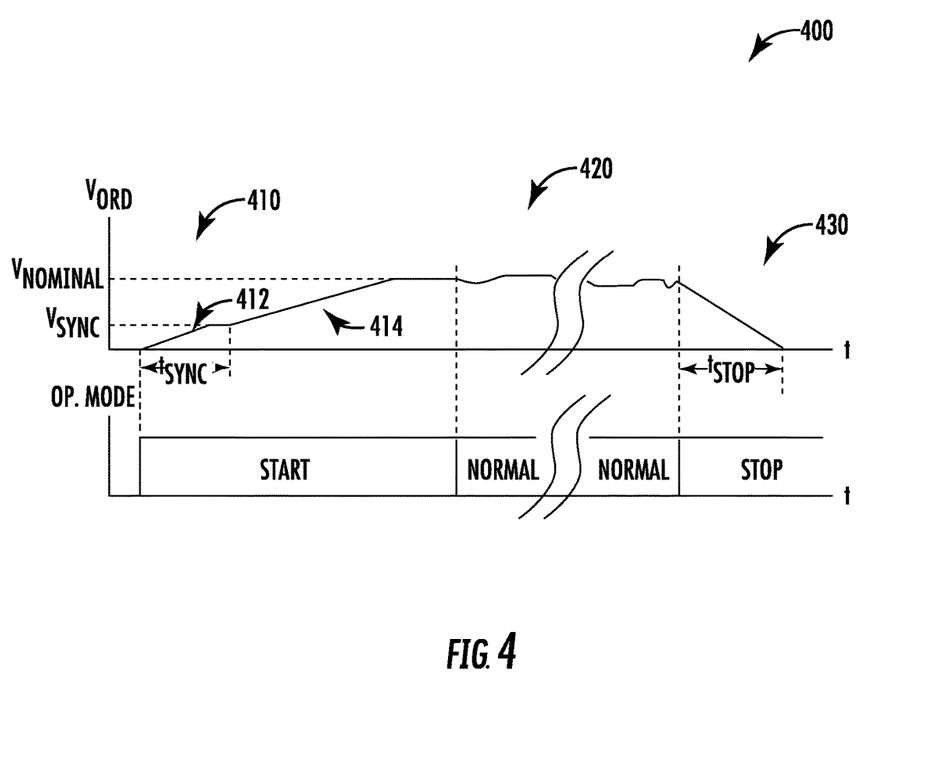
FIG. 4 depicts an example phased operating mode according to example embodiments of the present disclosure.

According to example aspects of the present disclosure, the black-start process can include phased operating modes. For instance, there can be a start period 410, a normal period 420, and a stop period 430 (as shown in FIG. 4). During the start period 410, the system bus voltage is gradually increased according to a start ramp and individual BESS units 120 are connected to the system bus 150 per each unit's own criteria of bus voltage and phase. When a threshold number of BESS units 120 have connected to enable the system 100 to operate a required load, example methods can include operating system 100 as an isolated grid during the normal period 420. Finally, the system bus voltage can be decreased and each individual BESS unit 120 can be disconnected during the stop period 430.

Figure 2:
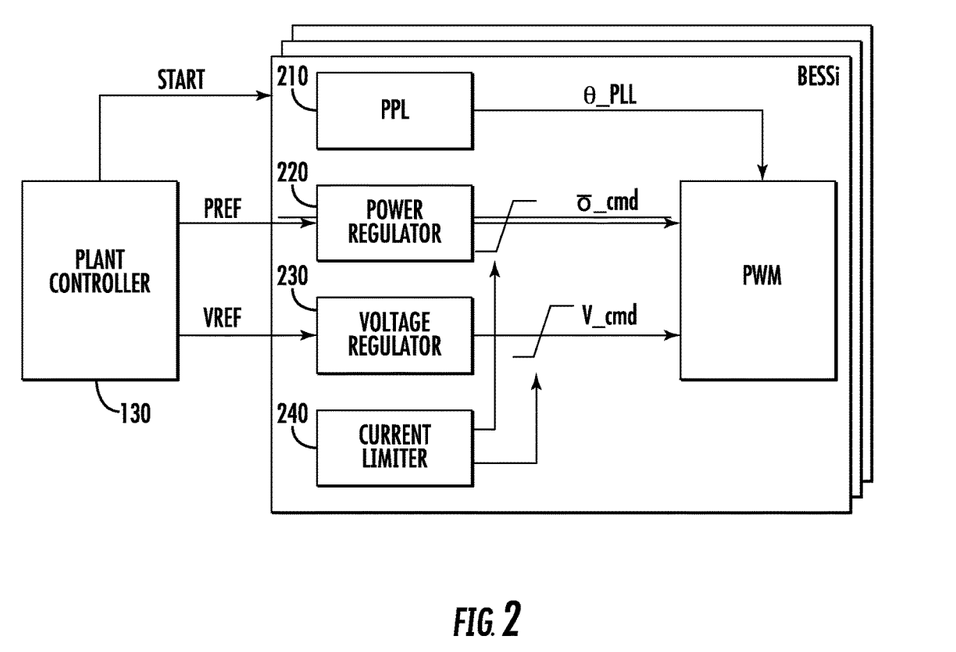
FIG. 2 depicts an example control block diagram according to example embodiments of the present disclosure.

FIG. 2 depicts an example control block diagram according to example embodiments of the present disclosure. Controller 130 can include a power regulator 220, a voltage regulator 230 and a current limiter 240. A phase lock loop (PLL) regulator 210 can supply the phase signal. A pulse width modulation (PWM) signal can be operated to supply pulsed output signals to segments of a multi-stage power transformer. Controller 130 can be used for generating the electronic control signals in response to a voltage command signal. Controller 130 can be the plant controller. Controller 130 can operate at a low sampling rate to provide slow reference signals (such as voltage reference, power reference, start/stop signal, etc.) to individual BESS units. The voltage command signal can establish the conduction times of the controllable switches. The voltage regulator 230 can be coupled for receiving a voltage error signal representative of any difference between a desired magnitude of voltage (Vref) from the inverter and a measured magnitude of voltage at the inverter output. The voltage regulator 230 is responsive to the voltage error signal for generating the voltage command signal with a magnitude and polarity sufficient to minimize or reduce the value of the voltage error signal. A power regulator 220 monitors the frequency of the inverter output voltage and compares the frequency to a reference frequency for generating the command signal for maintaining the frequency of the output voltage at the reference frequency.

Controller 130 can include one or more processors and one or more memory devices configured to perform a variety of computer-implemented functions and/or instructions (e.g., performing the methods, steps, calculations and the like and storing relevant data as disclosed herein). The instructions when executed by the processor can cause the processor to perform operations according to example aspects of the present disclosure.

By way of example, any/all of the "controllers" discussed in this disclosure can include a memory and one or more processing devices such as controllers, CPUs or the like, such as general or special purpose microprocessors operable to execute programming instructions or micro-control code. The memory can represent random access memory such as DRAM, or read only memory such as ROM or FLASH. In one embodiment, the processor executes programming instructions stored in memory. The memory can be a separate component from the processor or can be included onboard within the processor. Alternatively, controller 130 might also be constructed without using a microprocessor, using a combination of discrete analog and/or digital logic circuitry (such as switches, amplifiers, integrators, comparators, flip-flops, AND gates, and the like) to perform control functionality instead of relying upon software.

Figure 3:
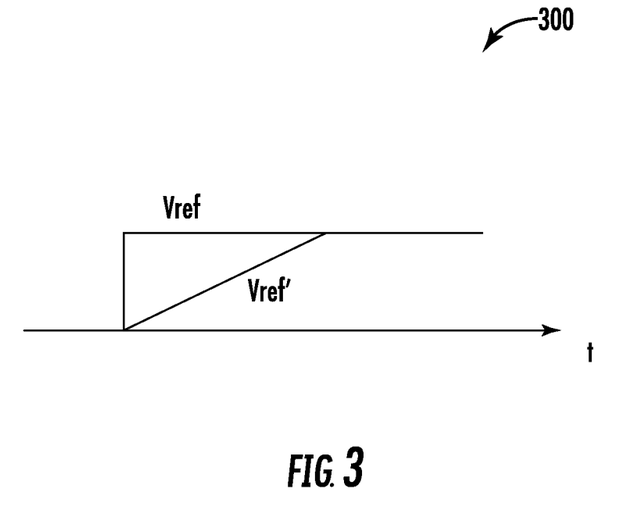
FIG. 3 depicts an example ramping voltage reference according to example embodiments of the present disclosure.

FIG. 3 depicts example ramping voltage reference 300 according to example embodiments of the present disclosure. In previous designs, when a plant controller was used to send a voltage command, a large voltage step rise was generated as shown by Vref. This can lead to undesirably high in-rush current when energizing plant transformers.

According to example aspects of the present disclosure, the voltage reference signal can be a ramping voltage reference signal as shown by Vref'. A ramping voltage reference signal can be used to facilitate the gradual increase of the bus system voltage. Gradually increasing the system bus voltage can prevent high in-rush current when energizing plant transformers.

FIG. 4 depicts a graphical representation of an example phased operating mode 400 according to example embodiments of the present disclosure. The operating modes include a start period 410. The start period 410 can include a sync period 412 and a nominal period 414. The system bus voltage can be increased to a sync threshold level during the sync period 412. The sync threshold level can be less than a nominal voltage level. During the sync period 412, the system bus voltage ramps at a certain rate to reduce in-rush current. The sync threshold voltage can be determined as a function of a maximum in-rush current for the power system using the following formula: $V_{sync} < 0.5 * X_{BESS} * I_{BESS\_MAX}$, wherein $X_{BESS}$ is the impedance between the BESS units 120.

During the sync period 412, a plurality of battery energy storage units 120 are individually connected to the system bus 150. The system bus voltage can be maintained at about the sync threshold level until a threshold number of BESS units 120 have connected to the system bus 150. The threshold number of BESS units 120 can be a minimum number of BESS units 120 to enable the system 100 to operate its required loads. The system bus voltage is increased using the BESS from the sync threshold level to the nominal voltage level. The nominal voltage value is the voltage value for normal operations. The system bus voltage is decreased gradually during a stop period 430 following the nominal period 414. The plurality of BESS units 120 are disconnected from the system bus 150 during the stop period 430.

Figure 5:
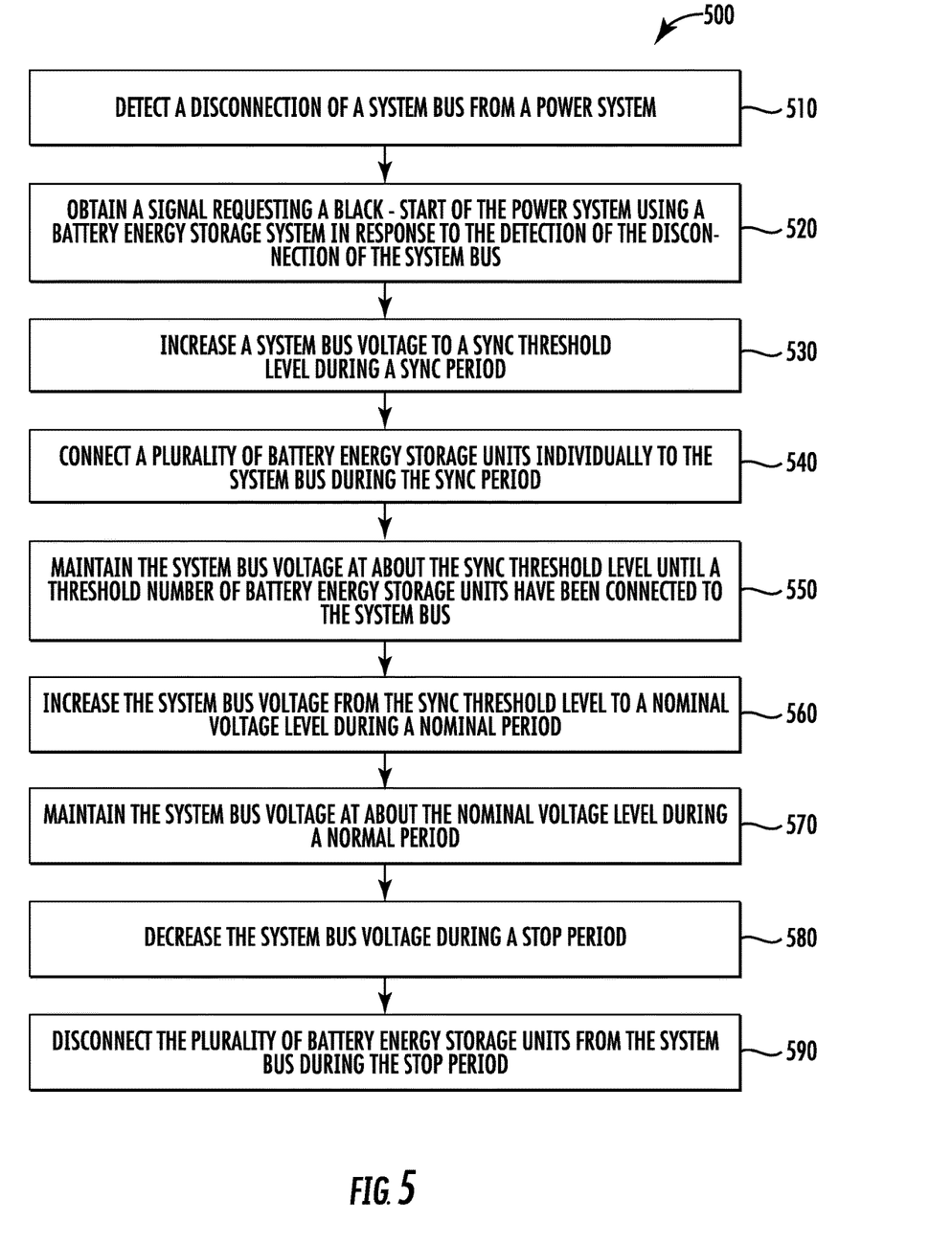
FIG. 5 depicts a flow diagram of an example method according to example embodiments of the present disclosure

FIG. 5 depicts a flow diagram of an example method 500 according to example embodiments of the present disclosure. Method 500 can be performed by controller 130 or by separate devices. FIG. 5 depicts steps performed in a particular order for purposes of illustration and discussion. Those of ordinary skill in the art, using the disclosure provided herein, will understand that the method discussed herein can be adapted, rearranged, expanded, omitted, performed simultaneously, or modified in various ways without deviating from the scope of the present disclosure.

At (510) the method can include detecting a disconnection of a system bus 150 from a power system. One or more controllers 130 can be used to detect the disconnection.

At (520) the method can include obtaining a signal requesting a black-start of the power system using a battery energy storage system. The signal can be sent in response to a detection of the disconnection of the system bus 150.

At (530) the method can include increasing the system bus voltage to a sync threshold level during a start period 410. The start period 410 can be broken into a sync period 412 and a nominal period 414. During the sync period 412 the system bus voltage can be brought up to a sync threshold voltage level. The sync threshold level can be less than a nominal voltage. The sync threshold voltage level can be determined as a function of a maximum in-rush current for the power system using the formula described above.

At (540) the method can include connecting a plurality of BESS units 120 individually to the system bus 150. The plurality of BESS units 120 can be individually connected to the system bus 150 based on each BESS unit's own criteria of bus voltage and phase.

At (550) the method can include maintaining the system bus voltage at about the sync threshold level until a threshold number of BESS units 120 have been connected to the system bus 150. The threshold number of BESS units 120 can be a minimum number of BESS units 120 to enable the system 100 to operate its required loads.

At (560) the method can include increasing the system bus voltage from the sync threshold level to a nominal voltage level when a threshold number of BESS units 120 have been connected. The nominal voltage level can be the voltage level for normal operations.

At (570) the method can include maintaining the system bus voltage at about the nominal voltage level during a normal period 420. During the normal period 420, the system 100 can be operated as an islanded system.

At (580) the method can include decreasing the system bus voltage during a stop period 430. During the stop period 430, the system bus voltage can be ramped down at a slow rate to help remove residual charge from plant transformers, induction motors, shunt capacitor banks and cable charges. Gradually decreasing the system bus voltage during stopping can help make a subsequent black-start more efficient.

At (590) the method can include disconnecting the plurality of BESS units 120 from the system bus 150. The system 100 can then be re-connected to the AC mains synchronizing automatically.

Although specific features of various embodiments can be shown in some drawings and not in others, this is for convenience only. In accordance with the principles of the present disclosure, any feature of a drawing can be referenced and/or claimed in combination with any feature of any other drawing.

This written description uses examples for the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for black-starting a power system using a battery energy storage system, the power system comprising one or more loads coupled to a system bus, the method comprising:
   obtaining, by the one or more controllers, a signal requesting a black-start of the power system using the battery energy storage system;
   increasing, by one or more controllers, a system bus voltage to a nominal voltage level using the battery energy storage system for a start period according to a start ramp; and
   maintaining, by one or more controllers, the system bus voltage at about the nominal voltage level using the battery energy storage system during a normal period following the start period, wherein the start period has a sync period and a nominal period, the system bus voltage is increased using the battery energy storage system to a sync threshold level during the sync period and the battery energy storage system comprises a plurality of battery energy storage units, each battery energy storage unit comprising one or more battery energy storage devices and an inverter, wherein during the sync period, a plurality of battery energy storage units are individually connected to the system bus per each battery storage unit's own criteria of bus voltage and phase.

2. The method of claim 1, wherein the sync threshold level is less than the nominal voltage level.

3. The method of claim 2, wherein the sync threshold level is determined as a function of a maximum in-rush current for the power system.

4. The method of claim 2, wherein the method comprises maintaining the system bus voltage at about the sync threshold level until a threshold number of battery energy storage units have been connected to the system bus.

5. The method of claim 4, wherein the system bus voltage is increased using the battery energy storage system from the sync threshold level to the nominal voltage level during the nominal period.

6. The method of claim 1, wherein the method further comprises decreasing the system bus voltage during a stop period following the normal period.

7. The method of claim 6, wherein the method comprises disconnecting the plurality of battery energy storage units from the system bus during the stop period.

8. A control system for black-starting a power system using a battery energy storage system, the power system comprising one or more loads coupled to a system bus, the control system configured to perform operations, the operations comprising:
   obtaining a signal requesting a black-start of the power system using the battery energy storage system, wherein the power system comprises one or more loads coupled to a system bus:
   increasing a system bus voltage to a nominal voltage level using the battery energy storage system for a start period according to a start ramp; and
   maintaining the system bus voltage at about the nominal voltage level using the battery energy storage system during a normal period following the start period, wherein the start period has a sync period and a nominal period, the system bus voltage is increased using the battery energy storage system to a sync threshold level during the sync period and the battery energy storage system comprises a plurality of battery energy storage units, each battery energy storage unit comprising one or more battery energy storage devices and an inverter, wherein during the sync period, a plurality of battery energy storage units are individually connected to the system bus per each battery storage unit's own criteria of bus voltage and phase.

9. The control system of claim 8, wherein the sync threshold level is less than the nominal voltage level.

10. The control system of claim 9, wherein the sync threshold level is determined as a function of a maximum in-rush current for the power system.

11. The control system of claim 9, wherein the operations further comprise maintaining the system bus voltage at about the sync threshold level until a threshold number of battery energy storage units have been connected to the system bus.

12. The control system of claim 11, wherein the system bus voltage is increased using the battery energy storage system from the sync threshold level to the nominal voltage level during the nominal period.

13. The control system of claim 8, wherein the operations further comprise decreasing the system bus voltage during a stop period following the normal period.

14. The control system of claim 13, wherein the operations further comprise disconnecting the plurality of battery energy storage units from the system bus during the stop period.

* * * * *